United States Patent
Zhu et al.

(10) Patent No.: US 10,558,900 B2
(45) Date of Patent: Feb. 11, 2020

(54) TWO-DIMENSIONAL CODE PROCESSING METHOD AND APPARATUS

(71) Applicant: ENN SCIENCE AND TECHNOLOGY DEVELOPMENT CO., LTD, Langfang (CN)

(72) Inventors: Zhenqi Zhu, Langfang (CN); Bryan Zhu, Holmdel, NJ (US)

(73) Assignee: ENN SCIENCE AND TECHNOLOGY DEVELOPMENT CO., LTD, Langfang, Hebei (CN)

( * ) Notice: Subject to any disclaimer, the term of this patent is extended or adjusted under 35 U.S.C. 154(b) by 105 days.

(21) Appl. No.: 15/894,828

(22) Filed: Feb. 12, 2018

(65) Prior Publication Data

US 2019/0236423 A1    Aug. 1, 2019

(30) Foreign Application Priority Data

Feb. 1, 2018    (CN) .......................... 2018 1 0103079

(51) Int. Cl.
*G06K 19/06*    (2006.01)

(52) U.S. Cl.
CPC . *G06K 19/06103* (2013.01); *G06K 19/06037* (2013.01)

(58) Field of Classification Search
CPC ................................................ G06K 17/06103
USPC ......................................................... 235/494
See application file for complete search history.

(56) References Cited

U.S. PATENT DOCUMENTS

| 2015/0324946 A1* | 11/2015 | Arce | ...................... G06T 1/0021 382/251 |
| 2018/0075570 A1* | 3/2018 | Arce | ...................... G06T 1/0021 |

* cited by examiner

*Primary Examiner* — Allyson N Trail
(74) *Attorney, Agent, or Firm* — Ladas & Parry, LLP

(57) ABSTRACT

A two-dimensional code processing method and an apparatus. The two-dimensional code processing method includes the following steps: obtaining multiple pieces of information of a product; generating a visual multi-eigenvalue image and at least two different two-dimensional codes according to the multiple pieces of information; selecting as a selected two-dimensional code, a two-dimensional code having a highest similarity with the visual multi-eigenvalue image, from the at least two different two-dimensional codes; fusing the selected two-dimensional code and the visual multi-eigenvalue image to generate a visual two-dimensional code.

17 Claims, 3 Drawing Sheets

TWO-DIMENSIONAL CODE PROCESSING METHOD AND APPARATUS

CROSS-REFERENCE TO RELATED APPLICATION

This application claims priority to Chinese Patent Application No. 201810103079.9, filed on Feb. 1, 2018, titled "TWO-DIMENSIONAL CODE PROCESSING METHOD AND APPARATUS", which is incorporated herein by reference in its entirety.

TECHNICAL FIELD

The present disclosure relates to a field of image recognition technology, more particularly, to a two-dimensional code processing method and an apparatus.

BACKGROUND

Two-dimensional code is a black and white graphic which is distributed according to a certain regulation in two-dimensional direction using a specific geometry. It stores information by using a number of geometry corresponding to the binary, with the use of the mask technology, making the distribution of the black and white pixel blocks of the two-dimensional code pattern as uniform as possible. The original intention of this design is to ensure the accuracy of machine identification. However, such two-dimensional code appears to include only black and white pixel blocks randomly distributed. The user can generally know the information of the corresponding marked object expressed by the two-dimensional code only after the two-dimensional code is recognized.

SUMMARY

A first aspect, the disclosure provides a two-dimensional code processing method, which includes:
  obtaining multiple pieces of information of a product;
  generating a visual multi-eigenvalue image and at least two different two-dimensional codes according to the multiple pieces of information, wherein the visual multi-eigenvalue image is an image that can be directly observed by human eyes and has a plurality of characteristic values;
  selecting a two-dimensional code a two-dimensional code having a highest similarity with the visual multi-eigenvalue image, from the at least two different two-dimensional codes;
  fusing the selected two-dimensional code and the visual multi-eigenvalue image to generate a visual two-dimensional code, wherein the visual two-dimensional code is a two-dimensional code can be directly observed by human eyes and with the visual multi-eigenvalue image.

In an optional implementation, the generating a visual multi-eigenvalue image according to the obtained multiple pieces of information includes:
  performing a graphics processing and a super-pixel image processing sequentially on the multiple pieces of information to generate the visual multi-eigenvalue image.

In an optional implementation, the selecting as a selected two-dimensional code, a two-dimensional code having a highest similarity with the visual multi-eigenvalue image, from the at least two different two-dimensional codes, is specifically: selecting as the selected two-dimensional code, a two-dimensional code having the highest similarity with the visual multi-eigenvalue image from the at least two different two-dimensional codes based on Mean Structure Similarity (MSSIM).

In an optional implementation, before the selecting as the selected two-dimensional code, a two-dimensional code having the highest similarity with the visual multi-eigenvalue image, from the at least two different two-dimensional codes, the method further includes: extracting image salient features from the visual multi-eigenvalue image.

In an optional implementation, the fusing the selected two-dimensional code and the visual multi-eigenvalue image to generate a visual two-dimensional code includes:
  obtaining a foreground area and a background area of the visual multi-eigenvalue image;
  proposing a function for evaluating a similarity between the selected two-dimensional code and the visual multi-eigenvalue image using the Mean Structure Similarity (MSSIM) as a similarity evaluation index in the foreground area of the visual multi-eigenvalue image;
  calculating an optimal solution of the function using a graph cut algorithm to obtain replaced pixel blocks corresponding to pixel blocks of the selected two-dimensional code, and using the replaced pixel blocks to replace the pixel blocks of the selected two-dimensional code in a first area of the selected two-dimensional code, the first area corresponding to the foreground area of the multi-eigenvalue image; and,
  combining the replaced pixel blocks in the first area with the pixel blocks in the second area of the selected two-dimensional code to generate a visible two-dimensional code, wherein the second area corresponds to the background area of the multi-eigenvalue image.

In an optional implementation, after the visual two-dimensional code is generated, the method further includes:
  comparing a grayscale value of each area of the visual two-dimensional code with a grayscale value of the corresponding area of the selected two-dimensional code;
  correcting the grayscale value of an area of the visual two-dimensional code when a comparison result between the grayscale value of the area of the visual two-dimensional code and the grayscale value of the corresponding area of the selected two-dimensional code exceeds a preset threshold.

A second aspect, the disclosure provides a two-dimensional code processing apparatus, which includes:
  an obtainer configured to obtain multiple pieces of information of a product;
  a visual multi-eigenvalue image generator configured to generate a visual multi-eigenvalue image according to the multiple pieces of information obtained by the obtainer, wherein the visual multi-eigenvalue image is an image can be directly observed by human eyes and with a plurality of characteristic values;
  a two-dimensional code generator configured to generate at least two different two-dimensional codes according to the multiple pieces of information obtained by the obtainer;
  a selector configured to select a two-dimensional code having a highest similarity with the visual multi-eigenvalue image from the at least two different two-dimensional codes generated by the two-dimensional code generator as a selected two-dimensional code; and
  a visual two-dimensional code generator configured to fuse the selected two-dimensional code selected by the selector and the visual multi-eigenvalue image generated by the visual multi-eigenvalue image generator to generate a visual two-dimensional code, wherein the visual two-dimensional code is a two-dimensional code can be directly observed by a human eye and with the visual multi-eigenvalue image.

In an optional implementation, the visual multi-eigenvalue image generator is specifically configured to perform a graphical processing and a super-pixel image processing sequentially on the multiple pieces of information to generate the visual multi-eigenvalue image.

In an optional implementation, the selector is specifically configured to select the two-dimensional code having the highest similarity with the visual multi-eigenvalue image from the at least two different two-dimensional codes generated by the two-dimensional code generator as the selected two-dimensional code based on Mean Structure Similarity (MSSIM).

In an optional implementation, the device further includes an extractor, which is configured to extract image salient features from the visual multi-eigenvalue image generated by the visual multi-eigenvalue image generator.

In an optional implementation, the visual two-dimensional code generator is specifically configured to: obtain a foreground area and a background area of the visual multi-eigenvalue image; propose a function for evaluating the similarity between the selected two-dimensional code and the visual multi-eigenvalue image using the MSSIM as a similarity evaluation index in the foreground area of the visual multi-eigenvalue image; calculate an optimal solution of the function using a Graph Cut algorithm to obtain replaced pixel blocks corresponding to pixel blocks of the two-dimensional code, and use the replaced pixel blocks to replace the pixel blocks of the selected two-dimensional code in a first area of the selected two-dimensional code, the first area corresponding to the foreground area of the multi-eigenvalue image; and combine the replaced pixel blocks in the first area with the pixel blocks in the second area of the selected two-dimensional code to generate a visible two-dimensional code, wherein the second area corresponds to the background area of the multi-eigenvalue image.

In an optional implementation, the device further includes: a comparator configured to compare a grayscale value of each area of the visual two-dimensional code generated by the visual two-dimensional code generator with a grayscale value of the corresponding area of the selected two-dimensional code; and a corrector configured to correct the grayscale value of an area of the visual two-dimensional code when the comparison result between the grayscale value of the area of the visual two-dimensional code and the grayscale value of the corresponding area of the selected two-dimensional code exceeds a preset threshold.

A third aspect of the disclosure provides an electronic equipment, which includes a processor and a memory. The memory stores one or more programs, the one or more programs comprising computer-executable instructions. When the electronic equipment is running, the computer-executable instructions are executed by the processor, so that the electronic equipment executes the two-dimensional code processing method described in any one of the first aspect and various optional implementations.

A fourth aspect of the disclosure provides a computer-readable storage medium, having computer programs stored thereon, and when the computer programs being loaded on a computer and executed by the computer, the computer executes the two-dimensional code processing method described in any one of the above first aspect and various optional implementations thereof.

A fifth aspect of the disclosure provides a computer program product which implements the two-dimensional code processing method described in any one of the above first aspect and various optional implementations.

BRIEF DESCRIPTION OF THE DRAWINGS

In order to describe technical solutions in embodiments of the present disclosure more clearly, the drawings to be used in the description of embodiments will be introduced briefly. Obviously, the drawings to be described below are merely some embodiments of the present disclosure, and a person of ordinary skill in the art can obtain other drawings according to those drawings without paying any creative effort.

DETAILED DESCRIPTION

Figure 1:
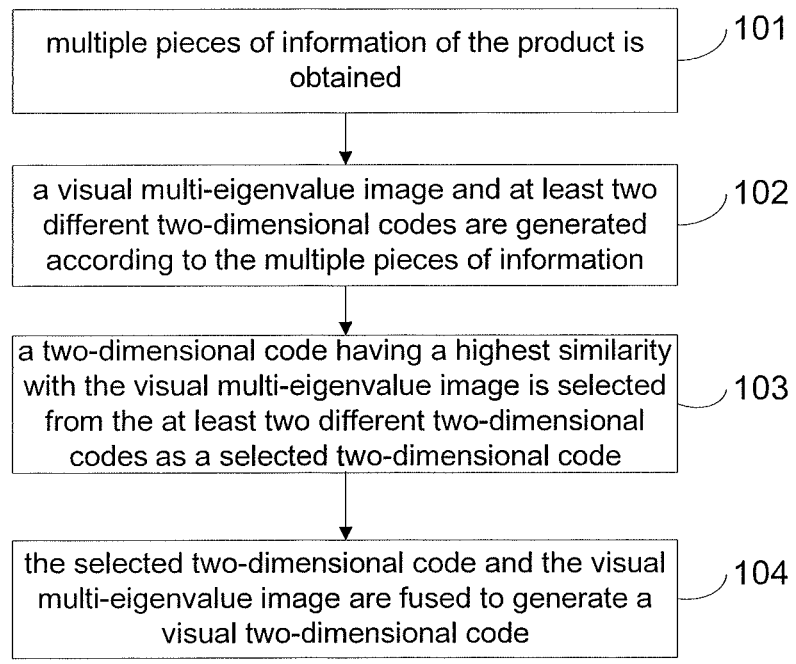
FIG. 1 is a flow diagram of a two-dimensional code processing method according to an embodiment of the present disclosure.

The technical solutions in the embodiments of the present disclosure will be described clearly and completely with reference to the drawings in the embodiments of the present disclosure. Obviously, the described embodiments are merely some but not all of embodiments of the present disclosure. All other embodiments made on the basis of the embodiments of the present disclosure by a person of ordinary skill in the art without paying any creative effort shall be included in the protection scope of the present disclosure.

A traditional two-dimensional code is only a black and white graphics, and cannot intuitively express its corresponding product information. How to integrate the product information into the two-dimensional code to intuitively express the product information is the problem to be solved herein. The embodiments of the present disclosure provide a two-dimensional code processing method and an apparatus, which enable the two-dimensional code to intuitively express the information of its corresponding product. The present disclosure generates a visual two-dimensional code that intuitively has a product information effect by generating an image from the information and adjusting the two-dimensional code to make it approximate to an image without affecting the decoding speed and accuracy of the two-dimensional code. The visual two-dimensional code can be easily applied to a variety of commercial occasions. For example, the customer obtains the product information directly on the mobile terminal by scanning the visual two-dimensional code, which is placed on the outer packaging bag of the product and present the product information, wherein the product information can be obtained in the form of a table or a radar graph; or, a window with a visual two-dimensional code presenting product information may be displayed beside the product when the user browse online products though a computer, and the product information can be presented in front of the user when the user clicks to enlarge the window or directly scan with a mobile terminal.

Therefore, this visual two-dimensional code has great commercial value and practical significance.

The present disclosure has the following beneficial effects.

By generating the visual multi-eigenvalue image and at least two different two-dimensional codes according to the multiple pieces of information, and selecting as a selected two-dimensional code, a two-dimensional code having the highest similarity with the visual multi-eigenvalue image, from the at least two different two-dimensional codes, and making the selected two-dimensional code and the visual multi-eigenvalue image being fused, a visual two-dimensional code is generated. Thus the visual two-dimensional code can intuitively expresses the information of the corresponding marked object, and it carries more information than the traditional two-dimensional code since the two-dimensional code contains multiple pieces of information about the product.

In the process of generating the visual multi-eigenvalue image, it is able to reduce the possibility of losing the information of the visual two-dimensional code generated by the fusion of the image in the subsequent operation and the number of the pixels of the image may by the graphics processing and the super-pixel image processing being sequentially performed, and thus saving the computing time of the subsequent operations involving pixels and improving the processing speed.

The selected two-dimensional code can have a high similarity with the visual multi-eigenvalue image based on the selection method of MSSIM (Mean Structure Similarity).

By accurately extracting a image contour generated according to the information, it is able to ignore non-critical areas and only preserve image salient features such as the boundary, so that the main content in the image can be better shown, thereby avoiding calculating too many discrete points which are unrelated and thus improving visual effects.

The visual multi-eigenvalue images and the two-dimensional code are better fused to generate the visual two-dimensional code with better visual effect by processing the foreground area and the background area of the visual multi-eigenvalue image respectively and replacing the pixel blocks of the selected two-dimensional code.

The recognition rate of the visual two-dimensional code can be effectively improved by correcting the gray scale of the visual two-dimensional code.

The embodiments of the present disclosure provide a two-dimensional code processing method, which is applicable to electronic equipments such as servers, terminal devices, and the like. As shown in FIG. 1, the method includes the following steps.

Step 101: multiple pieces of information of a product is obtained.

In this step, the product is an electronic product such as a mobile phone, a computer or the like, or a virtual product of software, network tools, and the like. The product may also be other types of products, which is not limited in the embodiments of the present disclosure.

In the embodiments of the present disclosure, the information can be one-dimensional or multi-dimensional indicator data. The information includes, but is not limited to, product type, product rank, function, quality, operation, maintenance, maintenance cost, life cycle cost, usage environmental indicators, user-friendliness degree, accessories availability indicators, configuration of the technical staff, manufacturer strength, service quality, speed ranking, product history, product replacement cycles and so on.

Optionally, after obtaining the multiple pieces of information of the product, the electronic equipment will set a corresponding digital list for the product. The digital list is used to store the information of the product, and the digital list may be implemented in a form of a table. The digital list can be open to the user so that the user can modify or maintain the data of the digital list so as to increase the credibility of the data of the digital list. Accordingly, the information in the embodiments of the present disclosure may further includes, but is not limited to, statistic data, statisticator ID of the digital list, product quality, product usage frequency in the digital list, correction historical data, corrector ID in the digital list, the digital list of a replaced product, the digital list of a potential replaced product or the other type of holographic digital list designed by certain rules and standards.

In an optional implementation, the electronic equipment obtains the multiple pieces of information of the product by means of web crawler, data cloud platform crawling, manual entry, and the like.

Optionally, after obtaining the multiple pieces of information of the product, the multiple pieces of information will be pre-processed. The pre-processing includes information cleaning and information conversion. The information cleaning is to re-examine and verify the information. The purpose of the information cleaning is to correct the errors in the information. The information conversion refers to convert the information according to certain rules, such as square root conversion, logarithm conversion and so on.

Step 102: a visual multi-eigenvalue image and at least two different two-dimensional codes are generated according to the multiple pieces of information.

In the embodiments of the present disclosure, the visual multi-eigenvalue image is the image that can be directly observed by human eyes and has a plurality of characteristic values.

In this step, the information is quantized to generate a numerical value having the attribute or feature of the information. The multiple pieces of information may be quantized to correspondingly generate a plurality of characteristic values. And thus the visual multi-eigenvalue image and the at least two different two-dimensional codes can be generated according to the plurality of characteristic values. The generation of the visual multi-eigenvalue image and the generation of the at least two different two-dimensional codes can be performed simultaneously or in succession. The at least two different two-dimensional codes may be generated specifically from the multiple pieces of information and the predefined text.

Optionally, in a specific embodiment of the present disclosure, the visual multi-eigenvalue image and the at least two different two-dimensional codes are generated according to the multiple pieces of information of the step 102 may be specifically that, performing a graphics processing and a super-pixel image processing on the multiple pieces of information sequentially to generate the visual multi-eigenvalue image. This embodiment can be specifically divided into the following steps.

Step 1021: a graphics processing is performed on the multiple pieces of information to obtain a temporary visual multi-eigenvalue image.

In the embodiments of the present disclosure, the temporary visual multi-eigenvalue image is a temporary image that can be directly observed by the human eyes and has a plurality of characteristic values. The temporary visual multi-eigenvalue image is used for obtaining the final visual multi-eigenvalue image by the subsequent super-pixel image processing. As for how to perform the graphics processing, it may be an information image processing to generate a simple table or a radar chart, which is not specifically limited in the embodiments of the present disclosure.

Step 1022: the temporary visual multi-eigenvalue image is converted from the RGB color space to the CIE-Lab color space.

After conversion, the color values (L, a, b) and the coordinates (x, y) of each pixel form a 5-dimensional vector V[L, a, b, x, y]. A similarity of any two pixels can be measured by the vector distance therebetween. The larger the distance is, the smaller the similarity is.

Step 1023: a super-pixel image processing is performed on the temporary visual multi-eigenvalue image to obtain a final visual multi-eigenvalue image in the CIE-Lab color space.

The step 1023 may be specifically as the following steps. First, the number K of super-pixels desired to generate is determined according to the number of smallest feature points that can be identified by the two-dimensional code, and at least one pixel closest to the super-pixel is searched in a surrounding space of each super-pixel, and then the at least one pixel is classified as the same category as the super-pixel. Next, a average vector value of all the pixels in each of the K super-pixels is calculated and new K super-pixels are re-obtained. Then, the new K super-pixels are used to search for the most similar pixels around them and after all the pixels which meet the requirement are classified, another new K super-pixels are re-obtained. The super-pixels of the clusters are updated, and then iterated again until convergence.

In this way, after the step 1023, the possibility of losing the information of the visual two-dimensional code generated by the fusion of the image in the subsequent operation can be reduced, and the number of the pixels of the image can be reduced, and thus it is able to save the computing time of the subsequent operations involving pixels and improve the processing speed.

Step 103: a two-dimensional code having a highest similarity with the visual multi-eigenvalue image is selected from the at least two different two-dimensional codes as a selected two-dimensional code.

Optionally, in a specific embodiment of the present disclosure, the step 103 may specifically be that, a two-dimensional code having the highest similarity with the visual multi-eigenvalue image is selected from the at least two different two-dimensional codes as a selected two-dimensional code based on MSSIM. The selected two-dimensional code can have a high similarity with the visual multi-eigenvalue image based on the selection method of MSSIM.

Optionally, in a specific embodiment of the present disclosure, before the two-dimensional code having the highest similarity with the visual multi-eigenvalue image is selected from the at least two different two-dimensional codes as the selected two-dimensional code, the method further includes, image salient features are extracted from the visual multi-eigenvalue image. Illustratively, the image salient features may be extracted with the use of a flow-based difference-of-Gaussians (FDoG) algorithm.

During the pre-processing of the image, by accurately extracting an image contour and other areas generated according to the information, it is able to ignore non-critical areas and only preserve the image salient features such as the boundary, so that the main content in the image can be better shown, thereby avoiding calculating too many discrete points which are unrelated and thus improving visual effects.

Step 104: the selected two-dimensional code and the visual multi-eigenvalue image are fused to generate a visual two-dimensional code.

In the embodiments of the present disclosure, the visual two-dimensional code is a two-dimensional code can be directly observed by human eyes and with the visual multi-eigenvalue image.

Optionally, in a specific embodiment of the present disclosure, the step 104 specifically includes the following steps.

Step 1041: a foreground area and a background area of the visual multi-eigenvalue image are obtained.

Step 1042: a function for evaluating the similarity between the selected two-dimensional code and the visual multi-eigenvalue image is proposed using the MSSIM as a similarity evaluation index in the foreground area of the visual multi-eigenvalue image.

Step 1043: an optimal solution of the function is calculated using a Graph Cut algorithm to obtain replaced pixel blocks corresponding to pixel blocks of selected the two-dimensional code, and the replaced pixel blocks are used to replace the pixel blocks of the selected two-dimensional code in a first area of the selected two-dimensional code, the first area corresponding to the foreground area of the multi-eigenvalue image; and, Step 1044: the replaced pixel blocks in the first area are combined with the pixel blocks in the second area of the selected two-dimensional code to generate a visible two-dimensional code, wherein the second area corresponds to the background area of the multi-eigenvalue image.

In the above step 1041, the foreground area and the background area of the visual multi-eigenvalue image can be obtained by using a background culling algorithm.

It should be noted that, the two-dimensional code generally consists of multiple modules. In a traditional two-dimensional code, the module can only have one of the two colors: black or white, no matter how many pixels the module has. In here, we relax the restriction by allowing both the black color and the white color to be existed in one module, therefore, the concept of "replacing pixel blocks" is proposed. The "replacing pixel blocks" is: assuming that a module is represented by m×m pixels, we let each pixel represent black or white, so that such module can have a total of $2^{m \times m}$ pixels, and both the black color and the white color can be existed in each module.

The visual multi-eigenvalue images can be better fused to the selected two-dimensional code to generate the visual two-dimensional code with better visual effect, by processing the foreground area and the background area of the visual multi-eigenvalue image respectively and replacing the pixel blocks of the selected two-dimensional code.

Optionally, in a specific embodiment of the present disclosure, after the step 104 in which the visual two-dimensional code is generated, the method further includes the following steps.

Firstly, a grayscale value of each area of the visual two-dimensional code is compared with a grayscale value of the corresponding area of the selected two-dimensional code.

Secondly, when a comparison result between the grayscale value of an area of the visual two-dimensional code and the grayscale value of the corresponding area of the selected two-dimensional code exceeds a preset threshold, the grayscale value of this area of the visual two-dimensional code is corrected. Illustratively, the correct process includes: the grayscale value of the area of the visual two-dimensional code is set as the grayscale value of the corresponding area to the selected two-dimensional code. In this way, the recognition rate of the visual two-dimensional code can be effectively improved by correcting the grayscale value of the visual two-dimensional code.

The embodiment of the present disclosure provides a two-dimensional code processing method. By generating the visual multi-eigenvalue image and at least two different two-dimensional codes according to the multiple pieces of information, and selecting as a selected two-dimensional code, a two-dimensional code having the highest similarity with the visual multi-eigenvalue image, from the at least two different two-dimensional codes, and making the selected two-dimensional code and the visual multi-eigenvalue image being fused, a visual two-dimensional code is generated. Thus the visual two-dimensional code can intuitively expresses the information of the corresponding marked object, and it carries more information than the traditional two-dimensional code since the two-dimensional code contains multiple pieces of information about the product.

It can be understood that, on one hand, the information about the related product can be intuitively seen through the visual two-dimensional code. On the other hand, a user terminal can obtain the information of the product when scanning the two-dimensional code of the product.

Optionally, the two-dimensional code of the product also carries the identification of the product. In this way, the user terminal may query cloud server for the other information of the product according to the identifier of the product, after scanning the two-dimensional code of the product.

Figure 2:
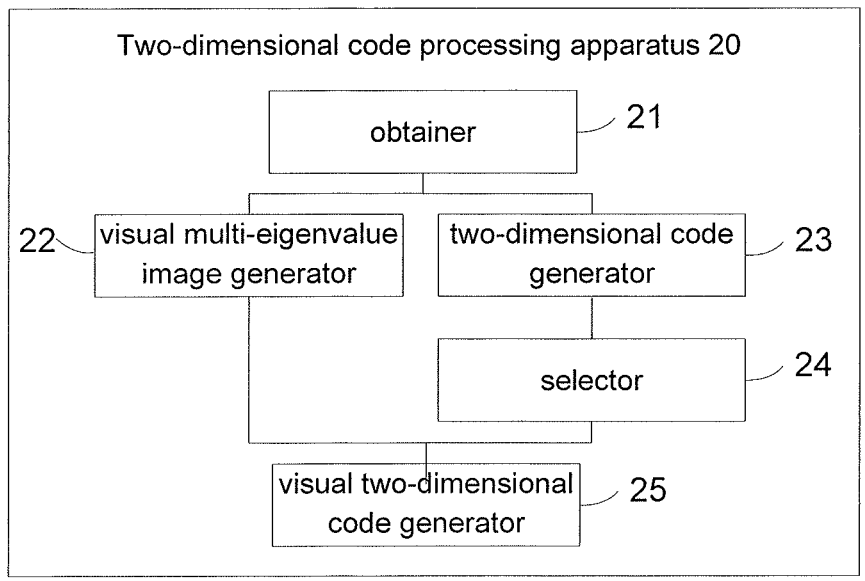
FIG. 2 is a schematic structural diagram of a first two-dimensional code processing apparatus according to an embodiment of the present disclosure.

An embodiment of the present disclosure provides a two-dimensional code processing apparatus 20, which may be disposed in an electronic equipment or attached to the electronic equipment. As shown in FIG. 2, the apparatus 20 includes an obtainer 21, a visual multi-eigenvalue image generator 22, a two-dimensional code generator 23, a selector 24, and a visual two-dimensional code generator 25.

The obtainer 21 is configured to obtain multiple pieces of information of a product.

The visual multi-eigenvalue image generator 22 is configured to generate a visual multi-eigenvalue image according to the multiple pieces of information obtained by the obtainer 21.

The two-dimensional code generator 23 is configured to generate at least two different two-dimensional codes according to the multiple pieces of information obtained by the obtainer 21.

The selector 24 is configured to select a two-dimensional code having a highest similarity with the visual multi-eigenvalue image from the at least two different two-dimensional codes generated by the two-dimensional code generator 23 as a selected two-dimensional code.

The visual two-dimensional code generator 25 is configured to fuse the selected two-dimensional code selected by the selector 24 and the visual multi-eigenvalue image generated by the visual multi-eigenvalue image generator 22 to generate a visual two-dimensional code.

The embodiment of the present disclosure provides a two-dimensional code processing apparatus 20. In the apparatus 20, the visual multi-eigenvalue image generator 22 and the two-dimensional code generator 23 respectively generate the visual multi-eigenvalue image and the plurality of different two-dimensional codes according to the multiple pieces of information obtained by the obtainer 21. The selector 24 selects a selected two-dimensional code, a two-dimensional code having the highest similarity with the visual multi-eigenvalue image from the at least two different two-dimensional codes. In addition, the visual two-dimensional code generator 25 fuses the selected two-dimensional code selected by the selector 24 and the visual multi-eigenvalue image generated by the visual multi-eigenvalue image generator 22 to generate a visual two-dimensional code. In this way, the two-dimensional code can intuitively express the information of the corresponding marked object. Moreover, since the two-dimensional code contains multiple pieces of information about the product, the two-dimensional code carries more information than the traditional two-dimensional code.

Optionally, in a specific embodiment of the present disclosure, the visual multi-eigenvalue image generator 22 may be configured to sequentially perform a graphical processing and a super-pixel image processing on the obtained multiple pieces of information to generate the visual multi-eigenvalue image.

Optionally, in a specific embodiment of the present disclosure, the selector 24 may be configured to select a two-dimensional code having the highest similarity with the visual multi-eigenvalue image from the at least two different two-dimensional codes generated by the two-dimensional code generator 23 as a selected two-dimensional code based on the method of MSSIM.

Figure 3:
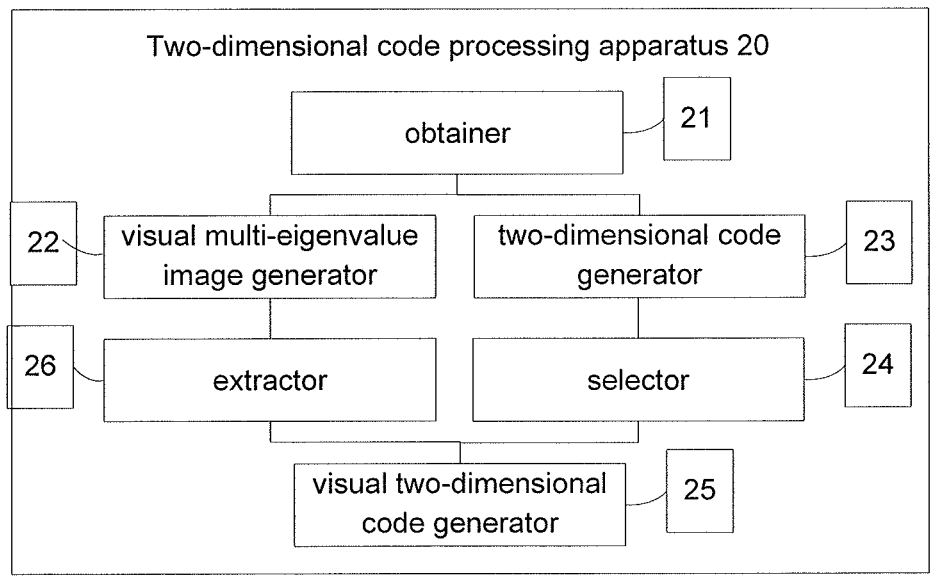
FIG. 3 is a schematic structural diagram of a second two-dimensional code processing apparatus according to an embodiment of the present disclosure.

Optionally, in a specific embodiment of the present disclosure, the apparatus 20 further includes an extractor 26 as shown in FIG. 3. The extractor 26 is configured to extract image salient features from the visual multi-eigenvalue image generated by the visual multi-eigenvalue image generator 22.

Optionally, in a specific embodiment of the present disclosure, the visual two-dimensional code generator 25 may be configured to obtain a foreground area and a background area of the visual multi-eigenvalue image, propose a function for evaluating the similarity between the selected two-dimensional code and the visual multi-eigenvalue image using the MSSIM as a similarity evaluation index in the foreground area of the visual multi-eigenvalue image, calculate an optimal solution of the function using a Graph Cut algorithm to obtain replaced pixel blocks corresponding to pixel blocks of the two-dimensional code, use these replaced pixel blocks to replace the pixel blocks of the selected two-dimensional code in a first area of the selected two-dimensional code, the first area corresponding to the foreground area of the multi-eigenvalue image, and combine the replaced pixel blocks in the first area with the pixel blocks in the second area of the selected two-dimensional code to generate a visible two-dimensional code, wherein the second area corresponds to the background area of the multi-eigenvalue image.

Figure 4:
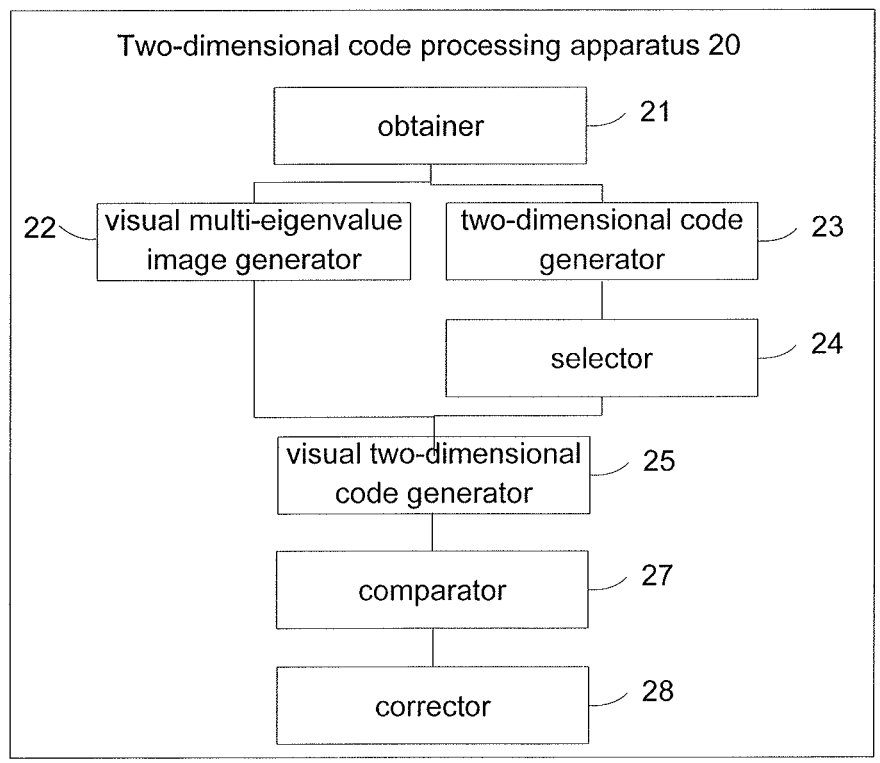
FIG. 4 is a schematic structural diagram of a third two-dimensional code processing apparatus according to an embodiment of the present disclosure.

Optionally, in a specific embodiment of the present disclosure, the apparatus 20 further includes a comparator 27 and a corrector 28 as shown in FIG. 4.

The comparator 27 is configured to compare a grayscale value of each area of the visual two-dimensional code generated by the visual two-dimensional code generator 25 with a grayscale value of the corresponding area of the selected two-dimensional code.

The corrector 28 is configured to correct the grayscale value of an area of the visual two-dimensional code when the comparison result between the grayscale value of the area of the visual two-dimensional code and the grayscale value of the corresponding area of the selected two-dimensional code exceeds a preset threshold.

Figure 5:
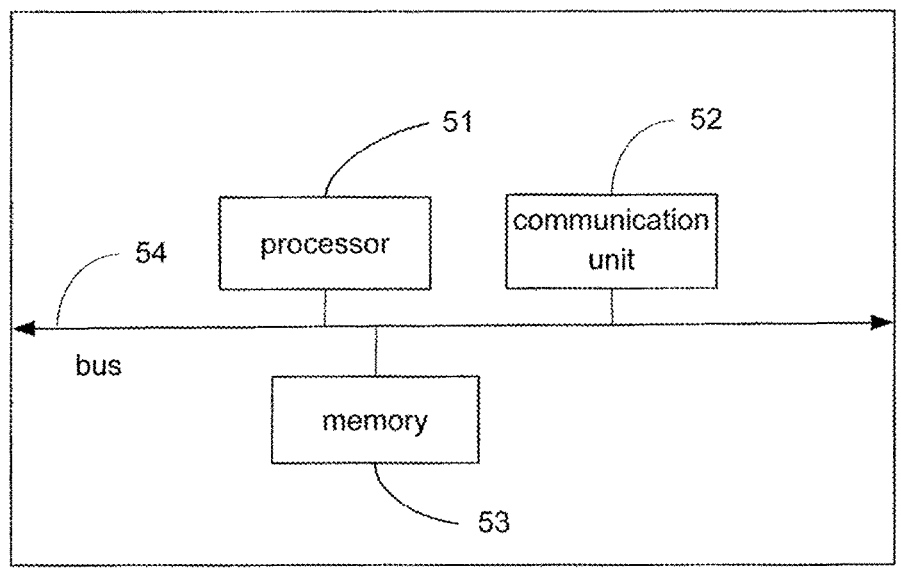
FIG. 5 is a schematic structural diagram of an electronic equipment provided by an embodiment of the present disclosure.

FIG. 5 shows a possible structure diagram of the electronic equipment involved in the above embodiments in the case of using an integrated unit. The electronic equipment 50 includes a processor 51. The processor 51 is configured to execute the steps performed by the obtainer 21, the visual multi-eigenvalue image generator 22, the two-dimensional code generator 23, the selector 24 and the visual two-dimensional code generator 25 and/or to execute the other processes configured for performing the techniques described herein. The electronic equipment 50 may further include a communication unit 52, a memory 53, and a bus 54. The communication unit 52 is configured to support communication between the electronic equipment and other devices. The memory 53 is configured to store program codes and data of the electronic equipment.

In the embodiments of the present disclosure, the above-described processor 51 may implement or perform various exemplary logic blocks, modules and circuits described in conjunction with the present disclosure. The processor 51 or controller may be a central processing unit, a general purpose processor, a digital signal processor, an application specific integrated circuit, a field programmable gate array or other programmable logic device, a transistor logic device, a hardware component, or any combination thereof. It can implement or perform various exemplary logic blocks, modules, and circuits described in connection with the present disclosure. The processor 51 may also be a combination of devices that implement computing functions, for example, including one or more microprocessor combinations, and the like.

The communication unit 52 may be a transceiver, a transceiver circuit, or a system interface and the like of the electronic equipment.

The memory 53 may include a volatile memory such as a random access memory. The memory 53 may also include a non-volatile memory such as a read only memory, a flash memory, a hard disk, or a solid state disk. In addition, the memory 53 may also include a combination of the above memories.

The bus 54 may be an Extended Industry Standard Architecture (EISA) bus or the like. The bus 54 may be divided into an address bus, a data bus, a control bus, and the like. For ease of representation, the bus 54 is represented by only one bold line as shown in FIG. 5, but this does not mean that there is only one bus or one type of bus in the embodiments of the present disclosure.

Optionally, in a specific embodiment of the present disclosure, the processor 51 is configured to perform a graphics processing and a super-pixel image processing on the multiple pieces of information sequentially to generate the visual multi-eigenvalue image.

Optionally, in a specific embodiment of the present disclosure, the processor 51 is configured to select the two-dimensional code having the highest similarity with the visual multi-eigenvalue image from the at least two different two-dimensional codes as the selected two-dimensional code based on the MSSIM.

Optionally, in a specific embodiment of the present disclosure, the processor 51 is configured to extract image salient features from the visual multi-eigenvalue Optionally, in a specific embodiment of the present disclosure, the processor 51 is configured to obtain a foreground area and a background area of the visual multi-eigenvalue image, propose a function for evaluating the similarity between the selected two-dimensional code and the visual multi-eigenvalue image using the method of MSSIM as a similarity evaluation index in the obtained foreground area of the visual multi-eigenvalue image, calculate the optimal solution of the function using a Graph Cut algorithm to obtain the replaced pixel blocks corresponding to pixel blocks of the two-dimensional code, use these replaced pixel blocks to replace the pixel blocks of the selected two-dimensional code in a first area of the selected two-dimensional code, the first area corresponding to the foreground area of the multi-eigenvalue image, and combine the replaced pixel blocks in the first area with the pixel blocks in the second area of the selected two-dimensional code to generate a visible two-dimensional code, wherein the second area corresponds to the background area of the multi-eigenvalue image.

Optionally, in a specific embodiment of the present disclosure, the processor 51 is configured to compare a grayscale values of each area of the visual two-dimensional code with a grayscale values of the corresponding areas of the selected two-dimensional code, and correct the grayscale value of an area of the visual two-dimensional code when the comparison result between the grayscale value of the area of the visual two-dimensional code and the grayscale value of the corresponding area of the selected two-dimensional code exceeds a preset threshold.

The same or similar parts among the embodiments in this description may be referred to each other, and each embodiment focuses on the differences from other embodiment. In particularly, the description of the apparatus embodiments is relatively simple since they are basically similar to the method embodiments, and reference may be made to the description of the method embodiments for the relevant part.

The embodiment of the present disclosure provides a computer readable storage medium having stored computer programs thereon. And when the computer programs is loaded on a computer and executed by the computer, the computer will execute the above two-dimensional code processing method.

In some embodiments of the present disclosure, the computer readable storage medium may be such as, but not limited to, an electrical, magnetic, optical, electromagnetic, infrared, or semiconductor system, apparatus, or device, or any combination of the above systems, apparatuses, or devices. More specific examples (a non-exhaustive list) of the computer-readable storage media include: an electrical connection having one or more wires, a portable computer diskette, a hard disk, a random access memory (RAM), a read only memory (ROM), an Erasable Programmable Read Only Memory (EPROM), an optical fiber, a Compact Disc Read-Only Memory (CD-ROM), an optical memory device, a magnetic memory device, or any suitable combination of the above devices. In embodiments of the present disclosure, the computer readable storage medium may be any tangible medium that includes or stores a program, which can be used by or in combination with an instruction execution system, apparatus, or device.

An embodiment of the present disclosure further provides a computer program product which implements the two-dimensional code processing method as described in the above embodiments when executed by a processor.

The above embodiments are merely illustrative embodiments for the purpose of illustrating the principles of the disclosure, but the disclosure is not limited thereto. It will be apparent to those skilled in the art that various changes and modifications can be made therein without departing from the spirit and essence of the disclosure, which are also considered to be within the protection scope of the disclosure.

Additional embodiments including any one of the embodiments described above may be provided by the disclosure, where one or more of its components, functionalities or structures is interchanged with, replaced by or augmented by one or more of the components, functionalities or structures of a different embodiment described above.

What is claimed is:

1. A two-dimensional code processing method, comprising:
   obtaining multiple pieces of information of a product;
   generating a visual multi-eigenvalue image and at least two different two-dimensional codes according to the obtained multiple pieces of information, wherein the visual multi-eigenvalue image is an image that can be directly observed by human eyes and has a plurality of characteristic values;
   selecting a two-dimensional code having a highest similarity with the visual multi-eigenvalue image from the at least two different two-dimensional codes as a selected two-dimensional code;
   fusing the selected two-dimensional code and the visual multi-eigenvalue image to generate a visual two-dimensional code, wherein the visual two-dimensional code is a two-dimensional code that can be directly observed by human eyes and with the visual multi-eigenvalue image;
   comparing a grayscale value of each area of the visual two-dimensional code with a grayscale value of a corresponding area of the selected two-dimensional code; and
   correcting the grayscale value of the area of the visual two-dimensional code when a comparison result between the grayscale value of the area of the visual two-dimensional code and the grayscale value of the corresponding area of the selected two-dimensional code exceeds a preset threshold.

2. The two-dimensional code processing method according to claim 1, wherein the generating a visual multi-eigenvalue image according to the obtained multiple pieces of information comprises:
   performing a graphics processing and a super-pixel image processing sequentially on the multiple pieces of information to generate the visual multi-eigenvalue image.

3. The two-dimensional code processing method according to claim 1, wherein the selecting a two-dimensional code having a highest similarity with the visual multi-eigenvalue image from the at least two different two-dimensional codes as a selected two-dimensional code comprises:
   selecting a two-dimensional code having the highest similarity with the visual multi-eigenvalue image from the at least two different two-dimensional codes as the selected two-dimensional code based on Mean Structure Similarity (MS SIM).

4. The two-dimensional code processing method according to claim 1, wherein before the selecting a two-dimensional code having the highest similarity with the visual multi-eigenvalue image from the at least two different two-dimensional codes as the selected two-dimensional code, the method further comprises:
   extracting image salient features from the visual multi-eigenvalue image.

5. The two-dimensional code processing method according to claim 1, wherein the fusing the selected two-dimensional code and the visual multi-eigenvalue image to generate a visual two-dimensional code comprises:
   obtaining a foreground area and a background area of the visual multi-eigenvalue image;
   proposing a function for evaluating a similarity between the selected two-dimensional code and the visual multi-eigenvalue image using a Mean Structure Similarity (MSSIM) as a similarity evaluation index in the foreground area of the visual multi-eigenvalue image;
   calculating an optimal solution of the function using a graph cut algorithm to obtain replaced pixel blocks corresponding to pixel blocks of the selected two-dimensional code, and using the replaced pixel blocks to replace the pixel blocks of the selected two-dimensional code in a first area of the selected two-dimensional code, the first area corresponding to the foreground area of the multi-eigenvalue image; and,
   combining the replaced pixel blocks in the first area with the pixel blocks in the second area of the selected two-dimensional code to generate a visible two-dimensional code, wherein the second area corresponds to the background area of the multi-eigenvalue image.

6. A computer-readable storage medium, having computer programs stored thereon, and when the computer programs being loaded on a computer and executed by the computer, the computer executes the two-dimensional code processing method of claim 1.

7. A computer program product which implements the two-dimensional code processing method of claim 1 when executed by a processor.

8. A two-dimensional code processing apparatus, comprising:
   an obtainer configured to obtain multiple pieces of information of a product;
   a visual multi-eigenvalue image generator configured to generate a visual multi-eigenvalue image according to the multiple pieces of information obtained by the obtainer, wherein the visual multi-eigenvalue image is an image can be directly observed by human eyes and has a plurality of characteristic values;
   a two-dimensional code generator configured to generate at least two different two-dimensional codes according to the multiple pieces of information obtained by the obtainer;
   a selector configured to select a two-dimensional code having a highest similarity with the visual multi-eigenvalue image from the at least two different two-dimensional codes generated by the two-dimensional code generator as a selected two-dimensional code; and
   a visual two-dimensional code generator configured to fuse the selected two-dimensional code selected by the selector and the visual multi-eigenvalue image generated by the visual multi-eigenvalue image generator to generate a visual two-dimensional code, wherein the visual two-dimensional code is a two-dimensional code that can be directly observed by a human eye and with the visual multi-eigenvalue image;
   a comparator configured to compare a grayscale value of each area of the visual two-dimensional code generated by the visual two-dimensional code generator with a grayscale value of a corresponding area of the selected two-dimensional code; and
   a corrector configured to correct the grayscale value of the area of the visual two-dimensional code when the comparison result between the grayscale value of the area of the visual two-dimensional code and the grayscale value of the corresponding area of the selected two-dimensional code exceeds a preset threshold.

9. The two-dimensional code processing apparatus according to claim 8, wherein the visual multi-eigenvalue image generator is specifically configured to perform a graphical processing and a super-pixel image processing sequentially on the multiple pieces of information to generate the visual multi-eigenvalue image.

10. The two-dimensional code processing apparatus according to claim 8, wherein the selector is specifically configured to select the two-dimensional code having the highest similarity with the visual multi-eigenvalue image from the at least two different two-dimensional codes generated by the two-dimensional code generator as the selected two-dimensional code based on Mean Structure Similarity (MSSIM).

11. The two-dimensional code processing apparatus according to claim 8, wherein the device further comprises an extractor, which is configured to extract image salient features from the visual multi-eigenvalue image generated by the visual multi-eigenvalue image generator.

12. The two-dimensional code processing apparatus according to claim 8, wherein the visual two-dimensional code generator is specifically configured to:
   obtain a foreground area and a background area of the visual multi-eigenvalue image;
   propose a function for evaluating the similarity between the selected two-dimensional code and the visual multi-eigenvalue image using a MSSIM as a similarity evaluation index in the foreground area of the visual multi-eigenvalue image;
   calculate an optimal solution of the function using a Graph Cut algorithm to obtain replaced pixel blocks corresponding to pixel blocks of the two-dimensional code, and use the replaced pixel blocks to replace the pixel blocks of the selected two-dimensional code in a first area of the selected two-dimensional code, the first area corresponding to the foreground area of the multi-eigenvalue image; and
   combine the replaced pixel blocks in the first area with the pixel blocks in the second area of the selected two-dimensional code to generate a visible two-dimensional code, wherein the second area corresponds to the background area of the multi-eigenvalue image.

13. An electronic equipment, comprising: a processor and a memory, wherein,
   the memory stores one or more programs, the one or more programs comprising computer-executable instructions, and when the computer-executable instructions are executed by the processor, cause the processor to:
   obtain multiple pieces of information of a product;
   generate a visual multi-eigenvalue image and at least two different two-dimensional codes according to the obtained multiple pieces of information, wherein the visual multi-eigenvalue image is an image that can be directly observed by human eyes and has a plurality of characteristic values;
   selecting a two-dimensional code having a highest similarity with the visual multi-eigenvalue image from the at least two different two-dimensional codes as a selected two-dimensional code;
   fusing the selected two-dimensional code and the visual multi-eigenvalue image to generate a visual two-dimensional code, wherein the visual two-dimensional code is a two-dimensional code that can be directly observed by human eyes and with the visual multi-eigenvalue image;
   compare a grayscale value of each area of the visual two-dimensional code with a grayscale value of a corresponding area of the selected two-dimensional code; and
   correct the grayscale value of the area of the visual two-dimensional code when a comparison result between the grayscale value of an area of the visual two-dimensional code and the grayscale value of the corresponding area of the selected two-dimensional code exceeds a preset threshold.

14. The electronic equipment of claim 13, wherein when the computer-executable instructions are executed by the processor, cause the processor further to perform a graphics processing and a super-pixel image processing on the multiple pieces of information sequentially to generate the visual multi-eigenvalue image.

15. The electronic equipment of claim 13, wherein when the computer-executable instructions are executed by the processor, cause the processor further to select the two-dimensional code having the highest similarity with the visual multi-eigenvalue image from the at least two different two-dimensional codes as the selected two-dimensional code based on the MSSIM.

16. The electronic equipment of claim 13, wherein when the computer-executable instructions are executed by the processor, cause the processor further to extract image salient features from the visual multi-eigenvalue image.

17. The electronic equipment of claim 13, wherein when the computer-executable instructions are executed by the processor, cause the processor further to:
   obtain a foreground area and a background area of the visual multi-eigenvalue image;
   propose a function for evaluating a similarity between the selected two-dimensional code and the visual multi-eigenvalue image using a Mean Structure Similarity (MSSIM) as a similarity evaluation index in the foreground area of the visual multi-eigenvalue image;
   calculate an optimal solution of the function using a graph cut algorithm to obtain replaced pixel blocks corresponding to pixel blocks of the selected two-dimensional code, and use the replaced pixel blocks to replace the pixel blocks of the selected two-dimensional code in a first area of the selected two-dimensional code, the first area corresponding to the foreground area of the multi-eigenvalue image; and,
   combine the replaced pixel blocks in the first area with the pixel blocks in the second area of the selected two-dimensional code to generate a visible two-dimensional code, wherein the second area corresponds to the background area of the multi-eigenvalue image.

* * * * *